United States Patent [19]

Relvini et al.

[11] Patent Number: 5,344,901
[45] Date of Patent: Sep. 6, 1994

[54] PROCESS FOR PREPARING ACRYLIC POLYMERS IN SUSPENSION

[75] Inventors: Pasquale Relvini, Milan; Nicola Anfossi, Varese, both of Italy

[73] Assignee: Atochem Industriale S.r.l., Milan, Italy

[21] Appl. No.: 120,870

[22] Filed: Sep. 15, 1993

Related U.S. Application Data

[63] Continuation of Ser. No. 19,814, Feb. 19, 1993, abandoned, which is a continuation of Ser. No. 701,903, May 17, 1991, abandoned.

[30] Foreign Application Priority Data

May 18, 1990 [IT] Italy .................. 20379 A/90

[51] Int. Cl.$^5$ .................. C08F 2/00; C08F 12/30
[52] U.S. Cl. .................. 526/201; 526/287
[58] Field of Search .................. 526/287, 201

[56] References Cited

FOREIGN PATENT DOCUMENTS

| | | | |
|---|---|---|---|
| 2323701 | 4/1908 | France . | |
| 56-139510 | 10/1981 | Japan | 526/287 |
| 56-161412 | 12/1981 | Japan | 526/287 |
| 62-127309 | 6/1987 | Japan | 526/287 |
| 1294714 | 11/1989 | Japan | 526/287 |

OTHER PUBLICATIONS

Chemical Abstracts, vol. 82, 1975, p. 32, No. 98800b.

*Primary Examiner*—Joseph L. Schofer
*Assistant Examiner*—N. Sarofin
*Attorney, Agent, or Firm*—Morgan & Finnegan

[57] ABSTRACT

The present invention relates to a process for preparing acrylic polymers by means of aqueous suspension polymerization in the presence of 0.05–1% by weight, calculated on the suspension, of a stabilizer consisting of a polymer prepared by polymerization of: 60–100% by weight of a salt of a sulphoacrylamide of general formula:

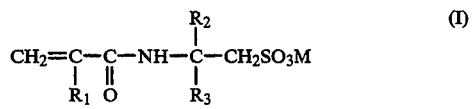

0–40% by weight of at least an acrylic monomer.

3 Claims, No Drawings

PROCESS FOR PREPARING ACRYLIC POLYMERS IN SUSPENSION

This is a continuation of co-pending application Ser. No. 08/019,814, filed on Feb. 19, 1993, which is a continuation of application Ser. No. 07/701,903, filed on May 17, 1991, both now abandoned.

FIELD OF THE INVENTION

The present invention concerns a process for preparing acrylic polymers in suspension.

BACKGROUND OF THE INVENTION

The term "acrylic polymers", whenever used in the present specification and in the claims, means the homopolymers or the copolymers of the alkyl esters of the acrylic or methacrylic acid, wherein the alkyl group contains from 1 to 8 carbon atoms.

Examples of said monomers are methyl acrylate, ethyl acrylate, propyl acrylate, isopropyl acrylate, butyl acrylate, methyl methacrylate, ethyl methacrylate, isopropyl methacrylate, sec.butyl methacrylate, tert.butyl methacrylate, etc.

The acrylic polymers can also contain up to 50% by weight of units derived from other monomers containing double bonds such as styrene, alpha-methylstyrene, acrylonitrile, (meth)acrylamide, n-alkyl maleimide or aryl maleimide, etc. or from double-unsaturation monomers such as, for example, butadiene.

The suspension polymerization is a kind of reaction which occurs in a system in which the monomer is suspended in the form of droplets in a continuous phase and it is polymerized by using a starter of the radical type and soluble in the monomer. Generally, the continuous phase is water.

The final product consists of a suspension of polymer particles (beads) having a diameter of 0.1–1 mm, which are easily separable from water by means of centrifugation.

Generally, the ratio between the continuous phase (water) and the discontinuous phase (monomer) ranges from 1:1 to 3:1.

In the practical embodiment of this type of process it is necessary to use suspension stabilizers which prevent the coalescence of the monomer droplets in the more advanced polymerization steps.

The suspension stabilizers utilized in the most usual technique are water-soluble macromolecular compounds having affinity for the monomer which, placing themselves at the interface between organic phase and aqueous phase, form a protective film which prevents the particles from caking.

On conclusion of the polymerization the suspending agent is removed from the surfaces of the polymer particles by washing with water.

The suspending agent is a key-factor as its characteristics condition the performances of the whole process as regards both the final polymer quality and the costs.

DESCRIPTION OF THE INVENTION

The Applicant has now found a process for preparing acrylic polymers in suspension which utilizes, as a suspending agent, a polymeric product which imparts high stability to the suspension, permits to obtain beads endowed with a regular morphology and free from agglomerates, even operating with water/monomer ratios very close to the unit, reduces the fouling of the polymerization reactors, lowers the concentration of the polymer in emulsion in the waste waters to extremely low values and, in the case of polymethylmethacrylate (PMMA), imparts a high optical purity to the product.

Thus, it is an object of the present invention to provide a process for preparing acrylic polymers by aqueous suspension polymerization conducted in the presence of 0.05–1% by weight, calculated on the suspension, of a stabilizer consisting of a polymer obtained by polymerization of: 60–100% by weight of a salt of a sulphoacrylamide having general formula:

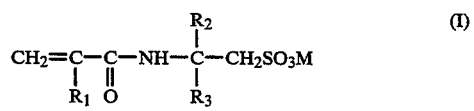

where $R_1$ represents a hydrogen atom or a $-CH_3$ group, $R_2$ and $R_3$, like or different from each other, represent a hydrogen atom or a $C_1-C_4$ alkyl radical and M represents an alkaline metal or an alkaline-earth metal such as, for example, sodium, potassium, calcium, magnesium, etc.; and 0–40% by weight of at least an acrylic monomer.

More in particular, the stabilizer of the invention consists of a polymer prepared by polymerization of: 70–90% by weight of monomer (I); and 10–30% by weight of acrylic monomer.

The products of general formula (I) are obtained by salification, for example with hydroxides of alkaline or alkaline-earth metals, of the corresponding sulphonic acids available on the market or easily preparable according to simple organic chemistry techniques. Examples of products of general formula (I) are: sodium 2-acrylamido-2-methylpropane sulphonate, sodium 2-methacrylamido-2-methylpropane sulphonate, sodium 2-acrylamidopropane sulphonate, sodium 2-acrylamido-2-ethane sulphonate, etc.

Examples of acrylic monomers which are utilizable in combination with the salt of general formula (I) are: (meth)acrylamide, alkaline salts (for example sodium or potassium) or alkaline-earth salts (for example calcium or magnesium) of (meth)acrylic acid, esters of the (meth)acrylic acid with an alkyl or isoalkyl $C_1-C_4$ alcohol, acrylonitrile, etc.

The stabilizers used in the process of the present invention can be produced by aqueous solution polymerization by using a water-soluble radical starter, for example potassium persulphate, optionally in the presence of a reducing agent.

The products so obtained, diluted in water at 5% by weight at 25° C., provide solutions exhibiting a Brookfield viscosity ranging from 0.5 to 10 Pa.s.

As regards the polymerization of the acrylic polymer, it is conducted in the presence of starters which, in consequence of temperature (50°–90° C.), decompose to radicals, and using process conditions which are well known to those skilled in the art.

Examples of starters are the peroxides such as tert.butylperoxy-2-ethylhexanoate, dibenzoyl peroxide, dilauroyl peroxide, tert.butylperoxydiethyl acetate, etc., or the unstable azo-compounds such as azodiisobutyronitrile.

When the obtained polymer is PMMA or a methyl methacrylate copolymer containing, for example, up to 25% by weight of another acrylic component, the product has the following optical properties:

Transmittance (ASTM D 1003-61): higher than 92% on 3 mm thick specimens;

Haze (ASTM D 1003-61): lower than 1.5% on 3 mm thick specimens;

Yellow index (ASTM D 1925-70): lower than 2.5 on 60 mm thick specimens;

these being typical characteristics of an excellent commercial product.

Illustrative Examples but not limiting examples are given hereinafter for a better understanding of the present invention and for carrying it into effect.

EXAMPLE 1

120 parts of a NaOH solution at 40% by weight and 630 parts of deionized water were charged into a reactor. 250 parts of 2-acrylamido-2-methylpropane sulphonic acid (AMPS) were gradually fed, whereafter the pH was adjusted in the range of from 7 to 8 by adding little amounts of soda or of AMPS. After having sent a nitrogen flow into the solution to remove oxygen and after heating to 50° C., potassium persulphate (0.075 parts) and sodium metabisulphite (0.025 parts) were added. Polymerization was completed in about 60 minutes. Then it was diluted with 4000 parts of deionized water, so obtaining a solution with a dry residue of 5.5% and a Brookfield viscosity of 4 Pa.s, measured at 25° C.

EXAMPLE 2

150 parts of a NaOH solution at 40% by weight and 596 parts of deionized water were charged into a reactor. 50 parts of methacrylic acid and 200 parts of AMPS were gradually fed under stirring. The pH was adjusted at 7–8 by addition of small amounts of soda or of AMPS. After having sent a nitrogen flow into the solution, the reactor jacket was heated up to 60° C. and when the inner temperature had stabilized, 0.04 parts of potassium persulphate were fed. Polymerization was completed in about 2 hours. Then it was diluted with 4000 parts of deionized water thereby obtaining a solution with a dry residue of 5.7% and a Brookfield viscosity of 5 Pa.s measured at 25° C.

EXAMPLE 3

97 parts of a NaOH solution at 40% by weight and 603 parts of deionized water were charged into a reactor. 200 parts of AMPS were gradually fed under stirring and the pH was adjusted at 7–8 by addition of little amounts of soda or of AMPS. 100 parts of an aqueous solution of acrylamide at 50% were added and oxygen was removed with nitrogen from the obtained solution, then the reactor jacket was heated up to 50° C. and when the inner temperature had stabilized, 0.025 parts of sodium metabisulphite and 0.075 parts of potassium persulphate were added. Polymerization was completed in about 1 hour. Then it was diluted with 4000 parts of deionized water, so obtaining a solution with a dry residue of 5.4% and a Brookfield viscosity of 4 Pa.s measured at 25° C.

EXAMPLE 4

The suspension polymerization of methyl methacrylate and of ethyl acrylate was carried out using, as a suspending agent, the homopolymer of the sodium salt of the 2-acrylamido-2-methylpropane sulphonic acid obtained in example 1.

Into a jacketed, stirred and pressure-resistant reactor there were charged 150 parts of deionized water and 6 parts of the solution obtained in example 1, corresponding to 0.33 parts of dry product. Oxygen was removed by means of a nitrogen flow and the solution was heated to 80° C. Then there were fed 100 parts of a deoxygenated mixture consisting of 96 parts of methyl methacrylate, 4 parts of ethyl acrylate, 0.25 parts of tert.butyl-peroxy-2-ethyl hexanoate, 0.12 parts of n-butane thiol.

It was pressurized to 100 KPa, the reactor was hermetically closed and the mixture was gradually heated up to 110° C. in 120 minutes under continuous stirring. The reactor was maintained at 110° C. for 15 minutes, then it was cooled.

The polymer, in the form of beads having a diameter of 0.2 mm, was separated from the mother liquors by filtration, it was washed with deionized water and oven-dried at 80° C.

The reactor walls, after washing with a water jet, appeared clean and the agglomerates were in an amount lower than 0.1% calculated on the recovered polymer.

The amount of polymer contained in the mother liquors in the form of particles in emulsion was equal to 0.3%.

The obtained polymer exhibited the typical characteristics of a good-quality extruded polymethyl methacrylate:

| | |
|---|---|
| Vicat softening point 49 N, method: ISO 306 | 110° C. |
| Melt Flow Index 230° C./3.6 kg, method: ISO 1133 | 1.2 g/10' |
| Light transmission (400–900 nm) specimen thickness: 3 mm, method ASTM D 1003-62 | 92% |
| Haze specimen thickness: 3 mm, method ASTM D 1003-61 | 0.5% |
| Yellow index specimen thickness: 60 mm, method ASTM D 1925-70 | 2.5% |

The beads, in the form of a flat plate, permitted to obtain an article having excellent aesthetical characteristics and free from surface defects.

EXAMPLE 5

Following the general operative modalities described in example 4, a copolymer of methyl methacrylate and ethyl acrylate was prepared. The copolymer of sodium 2-acrylamido-2-methylpropane sulphonate/sodium methacrylate in a ratio of 80/20 by weight, obtained in example 2, was utilized as a suspending agent.

200 parts of deionized water and 8 parts of the solution obtained in example 2, corresponding to 0.46 parts of solid product, were charged into the reactor. The solution was heated to 80° C. and a mixture was fed, which was composed of: 88 parts of methyl methacrylate, 12 parts of methyl acrylate, 0.2 parts of tert.butyl-peroxydiethylacetate, 0.45 parts of 2-ethylhexyl-3-mercapto-propionate. Polymerization was conducted according to the same modalities of example 4. Colorless and transparent beads having an average diameter of 0.2 mm were obtained at the end of polymerization.

The reactor walls, after washing with a water jet, were clean and free from agglomerates.

The amount of polymer contained in the mother liquors in the form of emulsion was equal to 0.5%.

A good quality polymer suitable for injection molding was obtained:

| | |
|---|---|
| Vicat softening point 49 N, method ISO 306 | 92° C. |
| Melt Flow Index 230° C./3.8 kg, method ISO 1133 | 10 g/10' |
| Light transmission (400-900 nm) specimen thickness: 3 mm, method ASTM D 1003-61 | 92% |
| Haze specimen thickness: 3 mm, method ASTM D 1003-61 | 0.5% |
| Yellow index specimen thickness: 60 mm, method ASTM D 1925-70 | 2.5 |

EXAMPLE 6

A copolymer of methyl methacrylate with styrene was prepared using, as a suspending agent, the copolymer sodium 2-acrylamido-3-methylpropane sulphonate/acrylamide (80/20 by weight), obtained in example 3. The general operative modalities described in example 4 were followed.

The reactor was charged with 150 parts of deionized water and 6 parts of the solution obtained in example 3, corresponding to 0.32 parts of dry product. The solution was heated to 70° C. and a mixture was fed, which was composed of: 60 parts of methyl methacrylate, 40 parts of styrene, 1 part of dilauryl perioxide, 0.12 parts of di-tert.dodecane thiol. After pressurization to 100 KPa with nitrogen, the reactor was hermetically closed. Polymerization was conducted at 70° C. for 5 hours, then it was heated to 100° C. in 1 hour and the reaction was completed maintaining this temperature for further 2 hours.

Beads having an average size of 0.3 mm were obtained.

After washing with a water jet, the reactor walls were clean and no agglomerates were present in the polymer.

The polymer fraction contained in the form of emulsion in the mother liquors was equal to 0.8%.

The resulting polymer was of good quality and exhibited characteristics suitable for injection molding:

| | |
|---|---|
| Vicat softening point 49 N, method ISO 306 | 95° C. |
| Melt Flow Index 230° C./10 kg, method ISO 1133 | 10 g/10' |
| Light transmission (400-900 nm) specimen thickness: 3mm, method ASTM D 1003-61 | 91% |
| Haze specimen thickness: 3 mm, method ASTM D 1003-61 | 1% |
| Yellow index specimen thickness: 60 mm, method ASTM D 1925-70 | 5 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A process for preparing acrylic polymers comprising aqueous-suspension polymerization carried out in the presence of 0.05–1% by weight, calculated on the suspension, of a stabilizer consisting of a polymer prepared by polymerizing: 60–100% by weight of a salt of a sulphoacrylamide of formula:

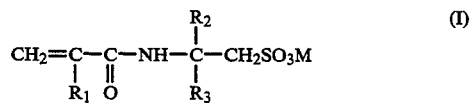

where $R_1$ represents a hydrogen atom or a $-CH_3$ group, $R_2$ and $R_3$, like or different from each other, represent a hydrogen atom or an alkyl $C_1$-$C_4$ radical and M represent an alkaline or alkaline-earth metal; and 0–40% by weight of at least an acrylic monomer.

2. The process according to claim 1, wherein the stabilizer consists of a polymer obtained by polymerizing: 70–90% by weight of monomer (I); and 10–30% by weight of acrylic monomer.

3. The process according to claim 1, wherein the stabilizer, diluted in water at 5% by weight at 25° C., provides solutions having a Brookfield viscosity ranging from 0.5 to 10 Pa.s.

* * * * *